T. N. ASHTON.
MUNICIPAL STREET CONDUIT SYSTEM.
APPLICATION FILED JAN. 3, 1916.
1,246,839.
Patented Nov. 20, 1917.
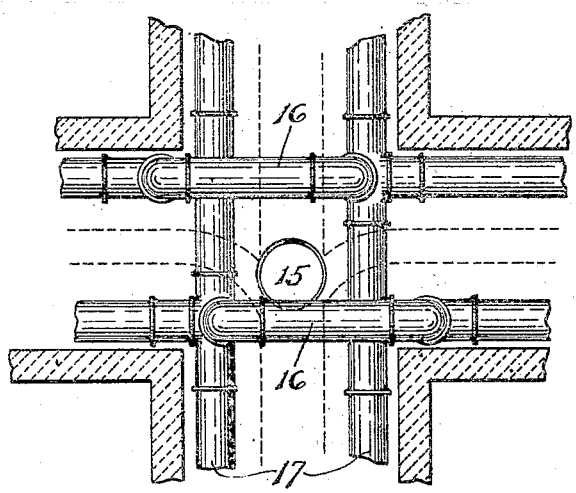
Inventor
Thomas N. Ashton.
Frank N. Allen.
By Frederick K. Daggett.
Attorneys.

UNITED STATES PATENT OFFICE.

THOMAS N. ASHTON, OF FALL RIVER, MASSACHUSETTS.

MUNICIPAL STREET-CONDUIT SYSTEM.

1,246,839.  Specification of Letters Patent.  Patented Nov. 20, 1917.

Application filed January 3, 1916. Serial No. 69,736.

*To all whom it may concern:*

Be it known that I, THOMAS N. ASHTON, a citizen of the United States, residing at Fall River, in the county of Bristol, in the State of Massachusetts, have invented a certain new and useful Improvement in Municipal Street-Conduit Systems, of which the following is a specification, reference being had to the accompanying drawings.

The object of this invention is to provide a conduit or subway system in which provision is made for housing all sewer, water, gas, steam and other pipes, and electric and other wires; the arrangement being such that said pipes and wires may be readily and conveniently reached for instalment, repairs, or re-arrangement.

The drawing represents my invention in plan.

Gas and water mains are shown at 16 together with a man-hole 15 in the main conduit and the mains from the intersecting street are shown at 17, the manner of connecting the water mains at the intersection or cross-over being also shown.

It will be noted that a conduit system is provided herein for intersecting subway streets comprising crosses joining alined and crossing pipe sections, each cross composed of a T and branch rising from said T, and a coupling section joined to each branch and passing over one of said alined sections and joined to one of said crossing sections, whereby a greatly simplified arrangement, with relatively reduced number of parts, is provided for carrying out the purposes of laying street water and gas mains and pipes, as is believed clearly apparent from the showing or disclosure made.

Having thus described my invention I claim as new and wish to secure by Letters Patent:—

A conduit system for intersecting subway streets, comprising crosses joining alined and crossing pipe sections, each cross composed of a T and branch rising from said T, a coupling section joined to each branch and passing over one of the said alined sections and joined to one of the said crossing sections.

THOMAS N. ASHTON.

Copies of this patent may be obtained for five cents each, by addressing the "Commissioner of Patents, Washington, D. C."